US010895327B2

(12) United States Patent
Tsou

(10) Patent No.: US 10,895,327 B2
(45) Date of Patent: Jan. 19, 2021

(54) LIQUID CONTROL VALVE ASSEMBLY HAVING MULTIPLE OUTLETS FOR BALANCING OUTPUT LIQUID

(71) Applicant: Eric Tsou, Taipei (TW)

(72) Inventor: Eric Tsou, Taipei (TW)

( * ) Notice: Subject to any disclaimer, the term of this patent is extended or adjusted under 35 U.S.C. 154(b) by 0 days.

(21) Appl. No.: 16/351,313

(22) Filed: Mar. 12, 2019

(65) Prior Publication Data
US 2020/0191283 A1    Jun. 18, 2020

(30) Foreign Application Priority Data

Dec. 14, 2018  (TW) .............................. 107145226 A

(51) Int. Cl.
| F16K 31/06 | (2006.01) |
| F16K 11/085 | (2006.01) |
| F16K 11/16 | (2006.01) |
| F16K 31/60 | (2006.01) |

(52) U.S. Cl.
CPC ........ F16K 11/0856 (2013.01); F16K 11/161 (2013.01); F16K 31/602 (2013.01); *F16K 31/061* (2013.01); *F16K 31/0613* (2013.01); *F16K 31/0627* (2013.01); *Y10T 137/4365* (2015.04); *Y10T 137/86107* (2015.04); *Y10T 137/87249* (2015.04)

(58) Field of Classification Search
CPC ............... F16K 31/061; F16K 31/0613; F16K 31/0627; Y10T 137/86107; Y10T 137/87249; Y10T 137/4365
See application file for complete search history.

(56) References Cited

U.S. PATENT DOCUMENTS

| 3,329,168 A | * | 7/1967 | Vollmer | ................ F15B 13/044 137/625.65 |
| 3,949,645 A | * | 4/1976 | Masclet | .................. B64C 25/26 91/459 |
| 4,254,799 A | * | 3/1981 | Blatt | .................... F15B 13/0402 137/625.66 |
| 4,359,064 A | * | 11/1982 | Kimble | ............... F15B 13/0817 137/269 |
| 4,503,886 A | * | 3/1985 | Simpson, Jr. | ........... F15B 13/04 137/596 |
| 4,619,187 A | * | 10/1986 | Blake | .................... F16D 48/062 137/596.16 |
| 4,729,408 A | * | 3/1988 | Coutant | .................. F16H 61/12 137/596.14 |
| 4,763,691 A | * | 8/1988 | Hahmann | ........... F15B 13/0402 137/596.14 |

(Continued)

*Primary Examiner* — Matthew W Jellett
*Assistant Examiner* — Christopher D Ballman
(74) *Attorney, Agent, or Firm* — Wang Law Firm, Inc.

(57) ABSTRACT

A liquid control valve assembly includes a main casing, three valve bodies and two plungers. The main casing has an external wall formed with an inlet and three outlets, defines a split-flow path, three valve chambers and a balanced channel therein such that the split-flow path is in communication with said inlet and said valve chambers while said balanced channel is in communication with said valve chambers and said three outlets. The valve bodies are disposed in the valve chambers respectively while the plungers are disposed in the balanced channel to move independently so that the liquid can be discharged stably from the outlets.

9 Claims, 17 Drawing Sheets

(56) References Cited

U.S. PATENT DOCUMENTS

| | | | | |
|---|---|---|---|---|
| 4,860,792 | A | * | 8/1989 | Ichihashi ............ F15B 13/0402 137/596.17 |
| 4,903,727 | A | * | 2/1990 | Motzer ................. F15B 20/001 137/596.16 |
| 4,924,902 | A | * | 5/1990 | Lewis ................. F15B 13/0402 137/270 |
| 5,586,570 | A | * | 12/1996 | Fukano ............... F15B 13/0402 137/271 |
| 5,692,427 | A | * | 12/1997 | Yoshida .................. F15B 11/17 91/6 |
| 5,887,618 | A | * | 3/1999 | Grundby ............... F15B 13/042 137/596.18 |
| 6,026,856 | A | * | 2/2000 | Miyazoe ............. F15B 13/0402 137/596.16 |
| 6,041,819 | A | * | 3/2000 | Walleman ............... F16K 11/07 137/240 |
| 6,109,291 | A | * | 8/2000 | Yoshimura .......... F15B 13/0402 137/269 |
| 6,702,024 | B2 | * | 3/2004 | Neugebauer .......... E21B 49/081 166/169 |
| 8,397,759 | B2 | * | 3/2013 | Oikawa ............... F16K 11/0716 137/596.2 |
| 8,613,292 | B2 | * | 12/2013 | Miyazoe ............... F15B 11/064 137/596.14 |
| 8,622,069 | B2 | * | 1/2014 | Ferreira .................... A61L 2/07 137/15.06 |
| 9,395,020 | B2 | * | 7/2016 | Bento ................. F15B 13/0402 |
| 9,791,055 | B2 | * | 10/2017 | Stucchi ................. F16K 31/008 |
| 9,903,396 | B2 | * | 2/2018 | Brinkman ........... F15B 13/0832 |
| 10,385,980 | B2 | * | 8/2019 | Hartwig ................. F15B 13/06 |
| 10,487,951 | B2 | * | 11/2019 | Patterson ............ F16K 11/0716 |
| 2007/0209723 | A1 | * | 9/2007 | Burrola ............... F16H 61/0251 137/625.65 |

\* cited by examiner

LIQUID CONTROL VALVE ASSEMBLY HAVING MULTIPLE OUTLETS FOR BALANCING OUTPUT LIQUID

CROSS-REFERENCE TO RELATED APPLICATION

This application claims the priority of Taiwanese application No. 107145226, filed on Dec. 14, 2018, which is incorporated herewith by reference.

BACKGROUND OF THE INVENTION

1. Field of the Invention

The present invention relates generally to a liquid control valve assembly, more particularly to a liquid control valve assembly having multiple outlets for balancing output liquid therefrom.

2. The Prior Arts

A conventional liquid control valve is a three-way valve that has one inlet end and two outlet ends, each of the two outlet ends is provided with a valve body in order to regulate the liquid flow and the flow velocity of the liquid flowing out from two outlet ends thereof.

Since the conventional liquid control valve has only two outlet ends, only two external devices can be supplied with liquid and in the event there are three external devices that need liquid supply simultaneously, the user must install an additional control valve or a second control valve for the third external device since the first liquid control valve is already used for connecting a liquid source and the two external devices. Some disadvantages resulted from the use of the prior art control valve reside in firstly: the liquid flow or the flow velocity of the liquid flowing from the liquid source to two external device is not stable, the liquid flow and the flow velocity of the liquid may suddenly rise or fall, secondly: one outlet end of the second control valve is left idle and not in use, and thirdly the user must pay an extra expense for purchase of the second control valve.

SUMMARY OF THE INVENTION

A primary objective of the present invention is to provide a liquid control valve assembly having multiple outlets and a balanced channel within which several plungers are provided in such a manner to regulate a very stable liquid flow and flow velocity of the liquid discharged from the outlets, thereby avoiding the problem of sudden rise and fall of the liquid flow and the flow velocity of the liquid encountered in the prior art.

In order to achieve the above objectives, a liquid control valve assembly of the present invention includes: a main casing, three valve bodies and two plungers. The main casing has an external wall formed with an inlet and three outlets. The main casing further defines a split-flow path, three valve chambers and a balanced channel therein such that the split-flow path is in communication with the inlet and the valve chambers while the balanced channel is in communication with the valve chambers and the three outlets so that when the inlet is connected to a liquid source, a liquid supplied by the liquid source sequentially passes through the inlet and the split-flow path to enter into the three valve chambers. The three valve bodies are disposed in the valve chambers respectively to regulate a liquid flow and a flow velocity of the liquid entering into the balanced channel after passing through the three valve bodies. The two plungers are disposed movably in the balanced channel.

In the liquid control valve assembly of the present invention, when one of the valve bodies is opened and the remaining two of the valve bodies are closed, the liquid passes through the one of the valve bodies to enter into the balanced channel to move the two plungers within the balanced channel in such a manner that the two plungers are moved away from an input end of one of the outlets so as to permit discharge of the liquid from one of the outlets while one of the plungers blocks the liquid, thereby preventing discharging of the liquid from remaining two outlets.

In the same manner, when two of the valve bodies are opened and the remaining one of the valve bodies is closed, the liquid passes through two of the valve bodies to enter into the balanced channel to move the two plungers within the balanced channel in such a manner that the two plungers are moved away from input ends of two of the outlets so as to permit discharge of the liquid from two of the outlets while at least one of the plungers blocks the liquid, thereby preventing discharging of the liquid from remaining one of the outlets.

In the same manner, when all of the valve bodies are opened, the liquid passes through all of the valve bodies to enter into the balanced channel to move the two plungers within the balanced channel in such a manner that the two plungers are moved away from the input ends of all of the outlets so as to permit discharge of the liquid from all of the outlets.

Preferably, the valve chambers are in communication with the balanced channel via a first guide channel, a second guide channel and a third guide channel respectively while the outlets are in communication with the balanced channel via a first connection channel, a second connection channel and a third connection channel respectively. The balanced channel has a first closed end and a second closed end.

Preferably, an output end of the first guide channel and an input end of the first connection channel are located proximate to the first closed end of the balanced channel and are staggered relative to each other.

Preferably, an output end of the second guide channel is located between the output end of the first guide channel and an output end of the third guide channel while an input end of the second connection channel is located between the input end of the first connection channel and an input end of the third connection channel.

Preferably, the output end of the third guide channel and the input end of the third connection channel are located proximate to the second closed end of the balanced channel and are staggered relative to each other.

In one embodiment of the present invention, the second connection channel includes a first branch channel and a second branch channel such that the output end of the second guide channel is staggered with an input end of the first branch channel and is further staggered with an input end of the second branch channel while the output end of the second guide channel is oriented toward a wall between the input end of the first branch channel and the input end of the second branch channel.

Preferably, a distance between the output end of the first guide channel and the first closed end of the balanced channel is less than a distance between the input end of the first connection channel and the first closed end of the balanced channel, wherein a distance between the output end of the third guide channel and the second closed end of the balanced channel is less than a distance between the input end of the third connection channel and the second closed end of the balanced channel.

Preferably, each of the plungers includes a plunger body, a first rod and a second rod. The plunger body has an outer diameter less than an inner diameter of the balanced channel and a longitudinal length greater than a diameter of the input ends of the first connection channel, the first branch channel, the second branch channel and the third connection channel. The first rod of one of the plungers is axially connected to one end of the plunger body of one of the plungers away from the other one of the plungers while the second rod of one of the plungers is axially connected to the other end of the plunger body of one of the plungers proximate to the other one of the plunger. Each of the first rods has an outer diameter less than an outer diameter of the plunger body while each of the second rods has an outer diameter less than the outer diameter of the plunger body. The first rod of one of the plungers has a longitudinal length greater than the distance between the output end of the first guide channel and the first closed end of the balanced channel but less than the distance between the input end of the first connection channel and the first closed end of the balanced channel. The first rod of the other one of the plungers has a longitudinal length greater than the distance between the output end of the third guide channel and the second closed end of the balanced channel but less than the distance between the input end of the third connection channel and the second closed end of the balanced channel. A total length of the second rods of the plungers is greater than the diameter of the output end of the second guide channel but less than a distance between outer sides of the input ends of the first and second branch channels.

Preferably, the external wall of the main casing is further formed with an overflow opening. The main casing further defines an overflow valve chamber therein in communication with the split-flow path and the overflow opening, and three pressure relief channels in communication between the overflow valve chamber and the valve chambers respectively. The liquid control valve assembly of the present invention further includes an overflow valve unit disposed in the overflow valve chamber such that a portion of the liquid within the split-flow path that does not pass through the valve bodies is discharged to an exterior of the main casing via the overflow opening after passing through the overflow valve unit while some of the liquid permeated within the overflow valve unit is relieved into the valve chambers through the pressure relief channels.

Preferably, each of the three valve bodies includes a needle valve disposed within the valve chambers respectively having an end portion protruding outwardly to an exterior of said main casing and a knob mounted on the end portion of the needle valve such that activation of the knob is capable of regulating an extension depth of the needle valve within a respective one of the valve chambers.

Preferably, each of the three valve bodies is a solenoid valve.

Preferably, the main casing further defines a switch valve chamber therein. The liquid control valve assembly of the present invention further includes a switch valve disposed in the switch valve chamber and having an end portion protruding outwardly to an exterior of the main casing and the other end portion extending into the split-flow path such that the switch valve regulates the liquid flow and the flow velocity of the liquid entering into the split-flow path after passing through the switch valve.

In one embodiment of the present invention, the main casing further defines a high pressure relief valve chamber therein. The liquid control valve assembly of the present invention preferably includes a high pressure relief valve disposed in the high pressure relief valve chamber and having an end portion protruding outwardly to an exterior of the main casing and the other end portion extending into the split-flow path such that the high pressure relief valve is capable of reducing a liquid pressure within the split-flow path.

The advantages provided by the liquid control valve assembly of the present invention are that since the plungers are disposed within the balanced channel to be movable independently and since the plungers are moved to different positions relative to the outlets due to the liquid flow within the first, second and third guide channels in a respective valve body, the liquid flow and the flow velocity of the liquid discharged from the outlets of the main casing can be stably regulated. In other words, the problem of sudden rise and fall of the liquid flow and the flow velocity of the liquid encountered in the prior art can be avoided.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

Figure 1:
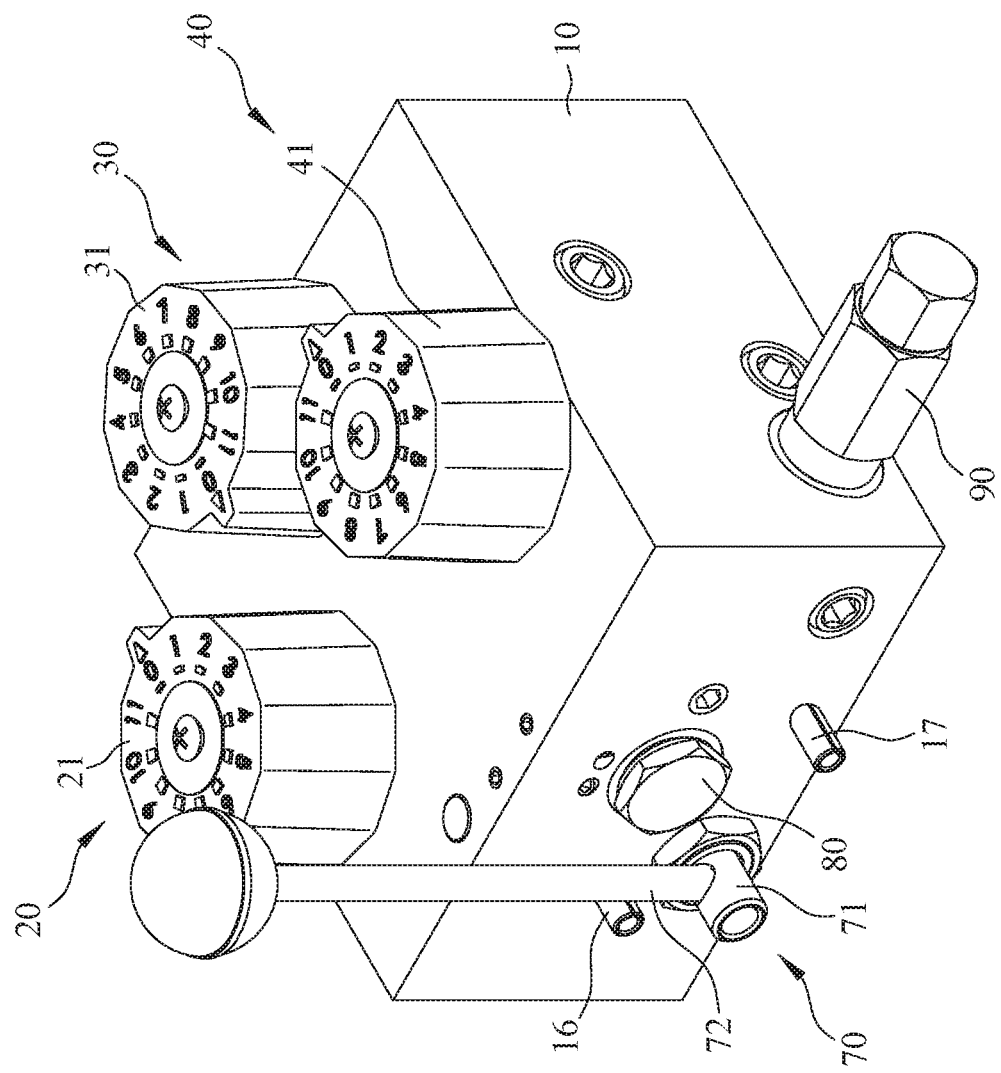
FIG. 1 is a perspective view of a liquid control valve assembly according to a first embodiment of the present invention.

The accompanying drawings are included to provide a further understanding of the invention, and are incorporated in and constitute a part of this specification. The drawings illustrate embodiments of the invention and, together with the description, serve to explain the principles of the invention.

Referring to FIGS. 1-6, a liquid control valve assembly according to a first embodiment of the present invention includes a main casing 10, three valve bodies 20, 30, 40 and two plungers 50, 60. The main casing 10 has an external wall formed with an inlet 101 and three outlets 102, 103, 104. The main casing 10 defines a split-flow path 11, three valve chambers 12, 13, 14 and a balanced channel 15 therein such that the split-flow path 11 is in communication with the inlet 101 and the valve chambers 12, 13, 14 while the balanced channel 15 is in communication with the valve chambers 12, 13, 14 and the three outlets 102, 103, 104 so that when the inlet 101 is connected to a liquid source 100, a liquid supplied by the liquid source 100 sequentially passes through the inlet 101 and the split-flow path 11 to enter into the three valve chambers 12, 13, 14. The three valve bodies 20, 30, 40 are disposed in the valve chambers 12, 13, 14 respectively to regulate a liquid flow and a flow velocity of the liquid entering into the balanced channel 15 after passing through the three valve bodies 20, 30, 40. The plungers 50, 60 are disposed movably in the balanced channel 15.

Figure 2:
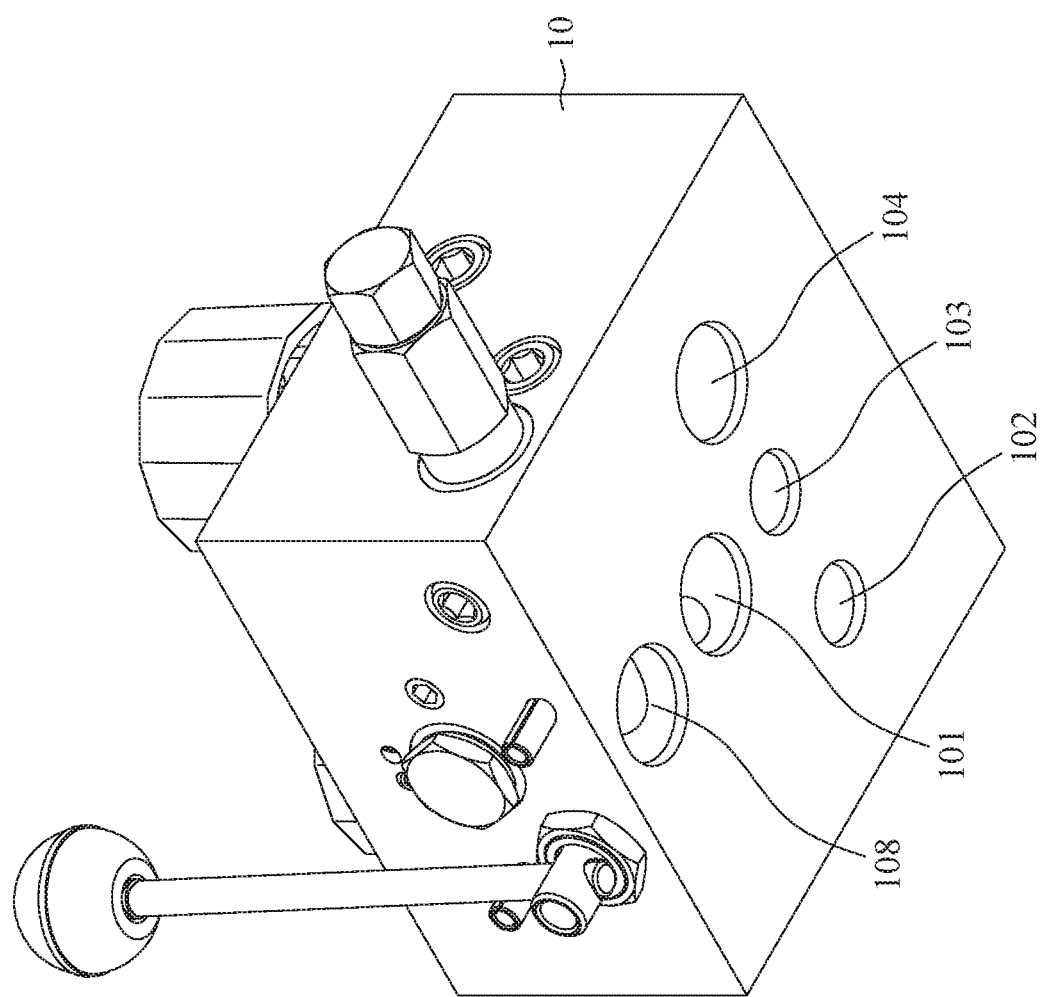
FIG. 2 is a perspective view of the liquid control valve assembly according to the first embodiment of the present invention from another angle.
Figure 3:
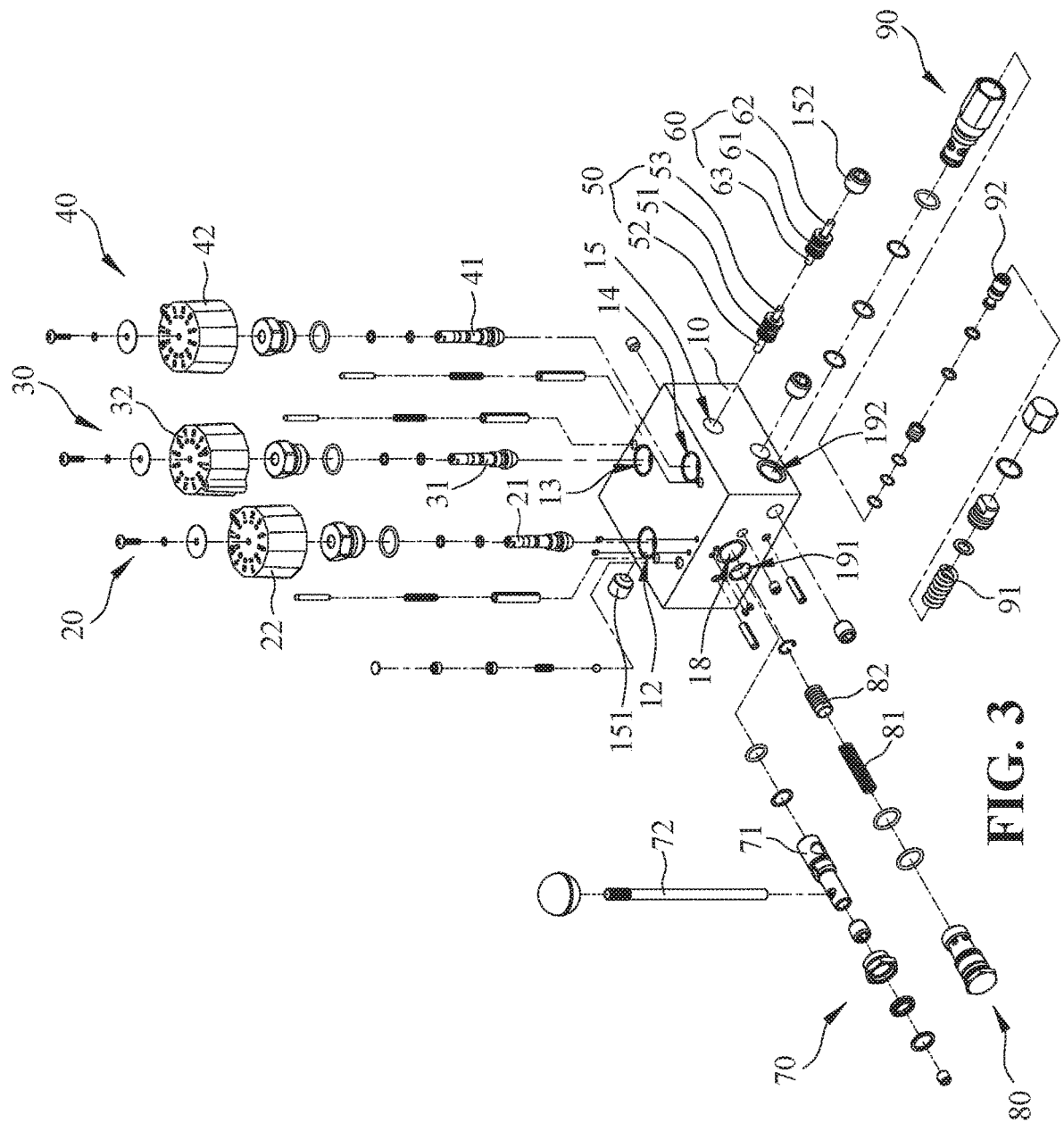
FIG. 3 is an exploded view of the liquid control valve assembly according to the first embodiment of the present invention.
Figure 7:
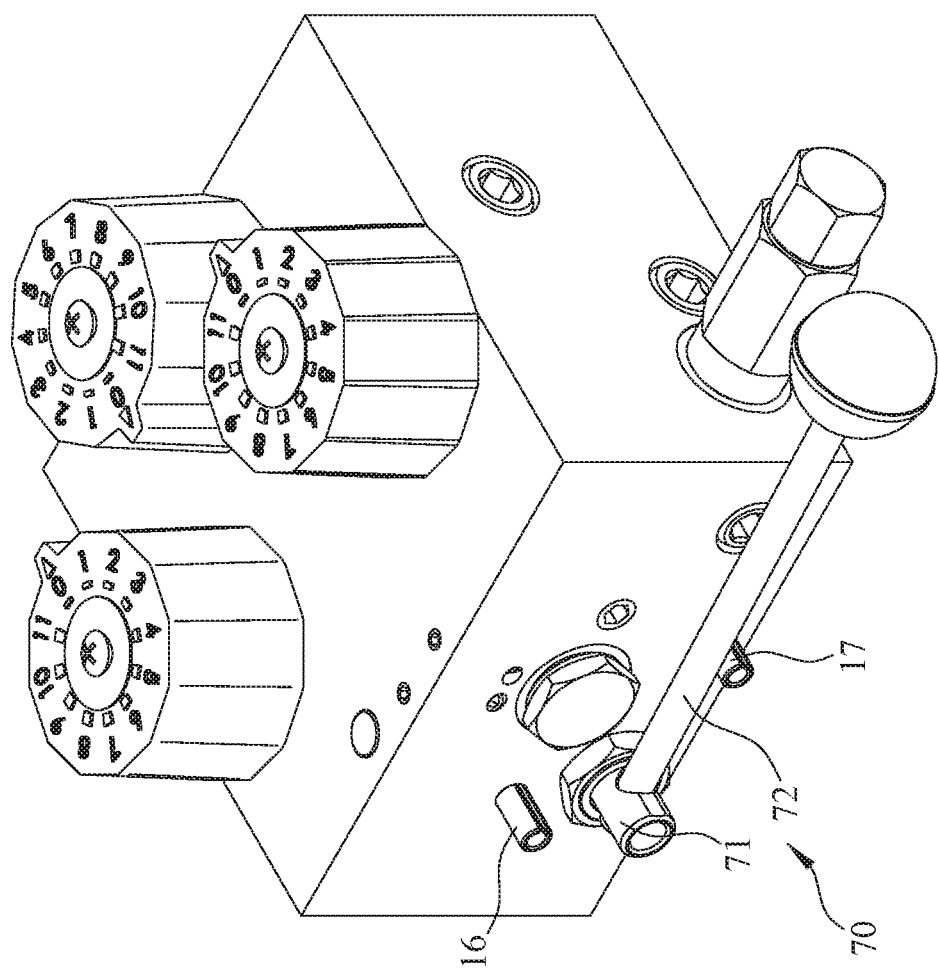
FIG. 7 is a perspective view of the liquid control valve assembly according to the first embodiment of the present invention, in which the valve bodies are opened.
Figure 8:
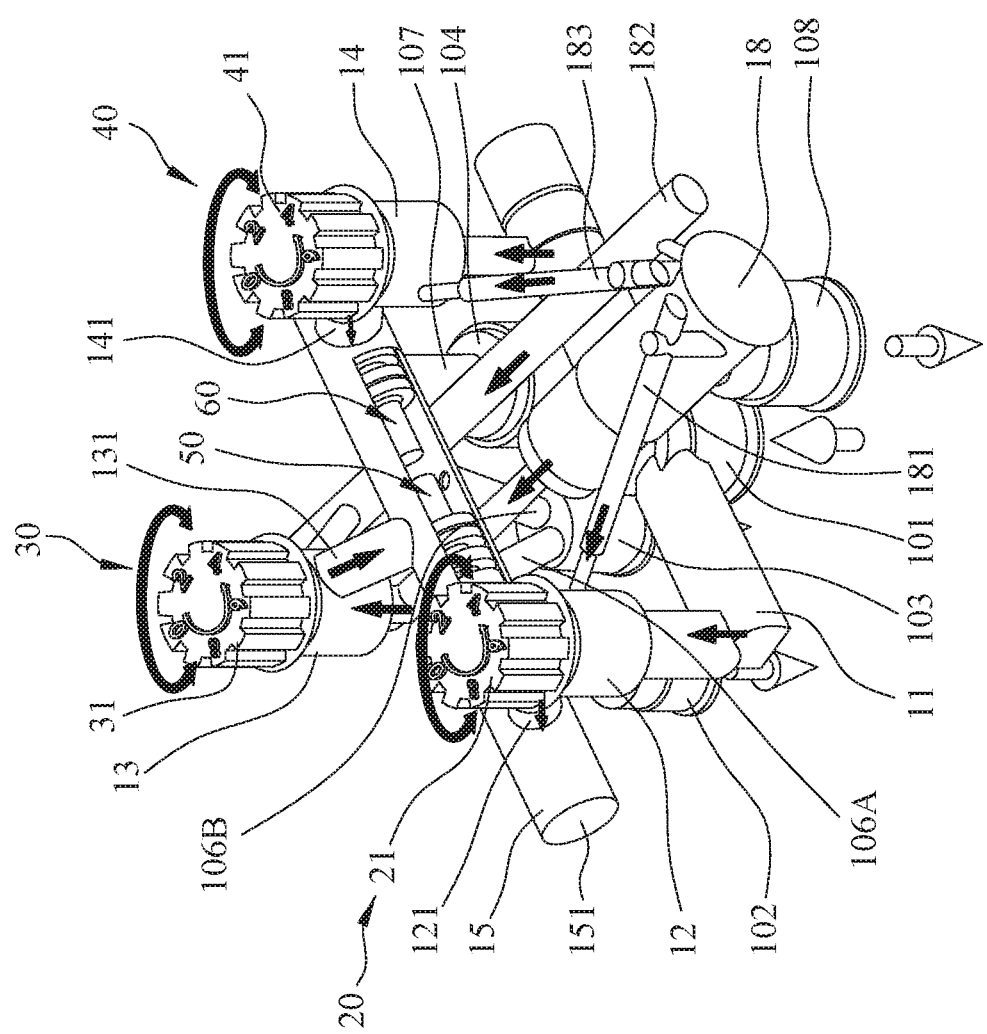
FIG. 8 is a perspective view illustrating the liquid flow within the main casing according to the first embodiment of the present invention.

Referring to FIGS. 1-3, the main casing 10 further defines a switch valve chamber 191 therein. The liquid control valve assembly of the present invention further includes a switch valve 70 disposed in the switch valve chamber 191 and having an end portion protruding outwardly to an exterior of the main casing 10 and the other end portion extending into the split-flow path 11 such that the switch valve 70 is capable of regulating the liquid flow and flow velocity of the liquid entering into the split-flow path 11 after passing through the switch valve 70. More specifically, the switch valve 70 preferably includes an operating lever 72, and a valve core 71 disposed rotatably in the switch valve chamber 191, having an end portion extending into the split-flow path 11 and the other end portion protruding to an exterior of the main casing 10 through one wall thereof to permit mounting of the operating lever 72 securely thereon so that the operating lever 72 can be rotated to drive the valve core 71 to rotate between open and closed positions. Note that the external wall of the main casing 10 is further formed with a first block 16 and a second block 17. The first block 16, the second block 17 and the operating lever 72 are on the same side of the main casing 10 so that, as best shown in FIGS. 1 and 2, when the operating lever 72 is rotated to abut against the first block 16, the valve core 71 is rotated to the closed position and disposed at a closed condition so as to block the inlet 101 of the main casing 10. At this time, the liquid supplied by the liquid source 100 cannot flow into the split-flow path 11 via the valve core 71. As best shown in FIGS. 7 and 8, when the user rotates the operating lever 72 to abut against the second block 17, the valve core 71 is rotated to the open position and disposed at an open condition so that the liquid can pass through the valve core 71 to enter into the split-flow path 11. The liquid passes through the split-flow path 11 to enter into the valve chambers 12, 13, 14.

Figure 4:
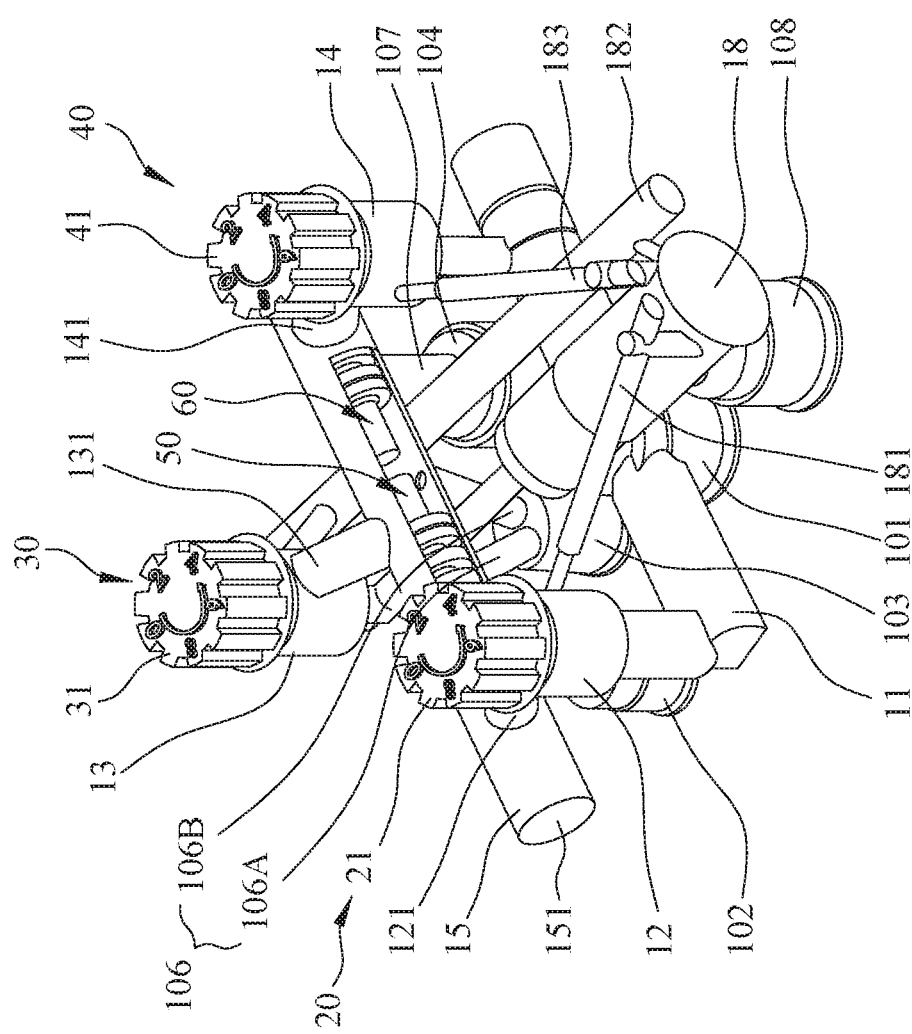
FIG. 4 is a perspective view of an interior of a main casing according to the first embodiment of the present invention.
Figure 5:
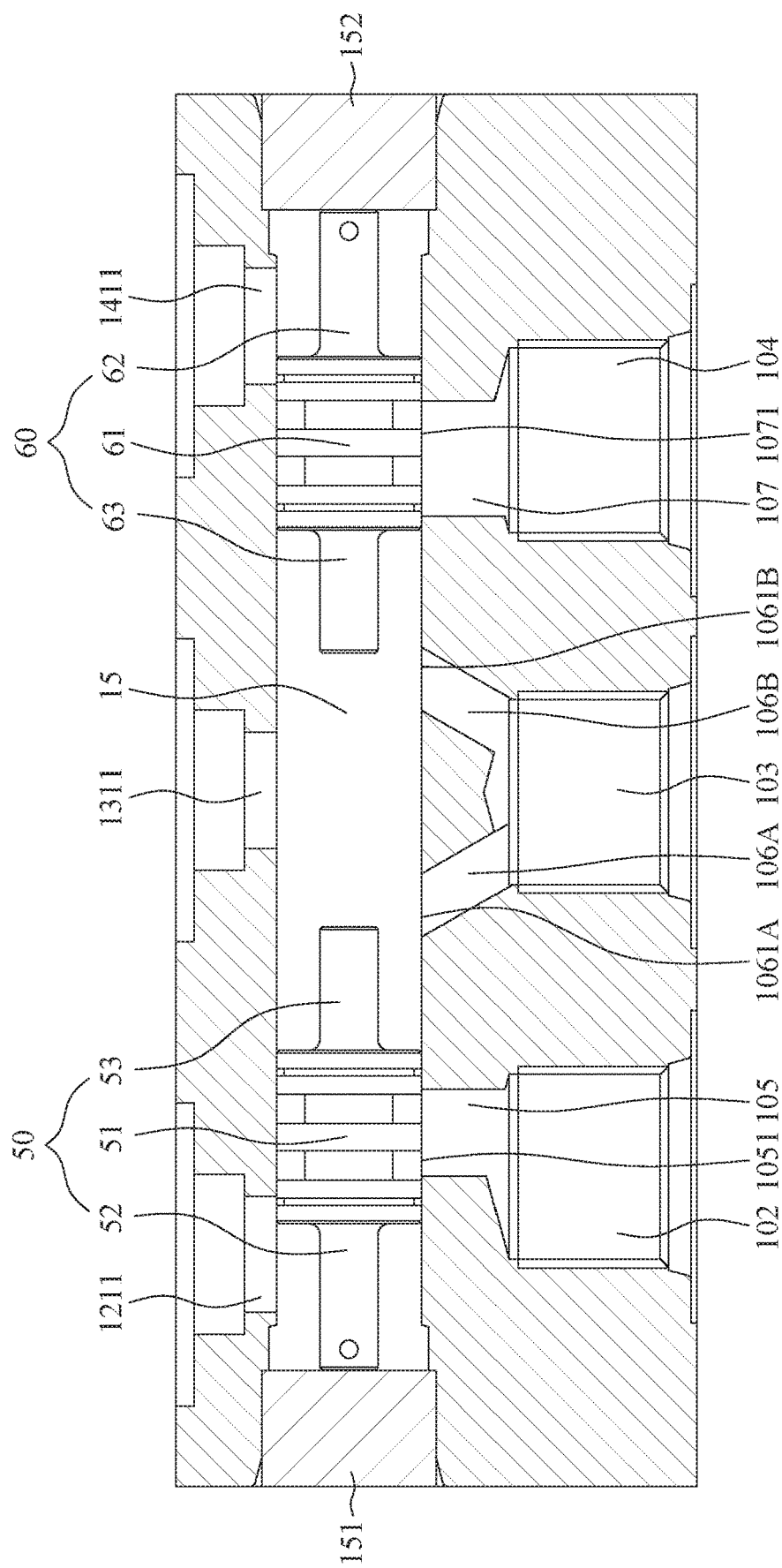
FIG. 5 is a cross-sectional view of an interior of the main casing according to the first embodiment of the present invention.

Referring to FIGS. 4 and 5, in the first embodiment of the present invention, the valve chambers 12, 13, 14 are in communication with the balanced channel 15 via a first guide channel 121, a second guide channel 131 and a third guide channel 141 while the outlets 102, 103, 104 are in communication with the balanced channel 15 via a first connection channel 105, a second connection channel 106 and a third connection channel 107 respectively. The balanced channel 15 has a first closed end 151 and a second closed end 152.

Preferably, an output end 1211 of the first guide channel 121 and an input end 1051 of the first connection channel 105 are located proximate to the first closed end 151 of the balanced channel 15 and are staggered relative to each other. In other words, the output end 1211 of the first guide channel 121 and the input end 1051 of the first connection channel 105 are not located on the same plane. Preferably, a distance between the output end 1211 of the first guide channel 121 and the first closed end 151 of the balanced channel 15 is less than a distance between the input end 1051 of the first connection channel 105 and the first closed end 151 of the balanced channel 15. Under this condition and as best shown in FIGS. 6, 8, 9, 12, 14 and 15, after the liquid sequentially passes through the valve body 20, the first guide channel 121 and the output end 1211 of the first guide channel 121 to enter into the balanced channel 15, the liquid would flow toward the input end 1051 of the first connection channel 105. At this time, since the output end 1211 of the first guide channel 121 and the input end 1051 of the first connection channel 105 are staggered relative to each other, the liquid generates a certain amount of thrust to move the plunger 50 toward the second closed end 152 of the balanced channel 15 such that the liquid finally passes through the first connection channel 105 and is discharged into an external device 201 via the outlet 102 of the main casing 10.

An output end 1311 of the second guide channel 131 is located between the output end 1211 of the first guide channel 121 and an output end 1411 of the third guide channel 141 while an input end of the second connection channel 106 is located between the input end 1051 of the first connection channel 105 and an input end 1071 of the third connection channel 107. Preferably, the second connection channel 106 includes a first branch channel 106A and a second branch channel 106B. The output end 1311 of the second guide channel 131 is staggered with an input end 1061A of the first branch channel 106A and is further staggered with an input end 1061B of the second branch channel 106B. The output end 1311 of the second guide channel 131 is oriented toward a wall between the input end 1061A of the first branch channel 106A and the input end 1061B of the second branch channel 106B. In other words, the output end 1311 of the second guide channel 131 and the input end 1061A of the first branch channel 106A are not located in the same plane and the output end 1311 of the second guide channel 131 and the input end 1061B of the second branch channel 106B are not located on the same plane. Under this condition and as best shown in FIGS. 6, 8, 11, 13, 14 and 15, after the liquid sequentially passes through the valve body 30, the second guide channel 131 and the output end 1311 of the second guide channel 131 to enter into the balanced channel 15, the liquid would flow toward the input ends 1061A, 1061B of the first and second branch channels 106A, 106B. At this time, since the output end 1311 of the second guide channel 131 and the input end 1061A of the first branch channel 106A are staggered relative to each other and since the output end 1311 of the second guide channel 131 and the input end 1061B of the second branch channel 106B are staggered relative to each other, the liquid generates a certain amount of thrust to move the plungers 50, 60 toward the first and second closed ends 151, 152 of the balanced channel 15 such that the liquid finally passes through the first branch channel 106A and the second branch channel 106B and mixes together in the outlet 103 and is discharged into an external device 202 via the outlet 103 of the main casing 10.

The output end 1411 of the third guide channel 141 and the input end 1071 of the third connection channel 107 are located proximate to the second closed end 152 of the balanced channel 15 and are staggered relative to each other. In other words, the output end 1411 of the third guide channel 141 and the input end 1071 of the third connection channel 107 are not located on the same plane. Preferably, a distance between the output end 1411 of the third guide channel 141 and the second closed end 152 of the balanced channel 15 is less than a distance between the input end 1071 of the third connection channel 107 and the second closed end 152 of the balanced channel 15. Under this condition and as best shown in FIGS. 6, 8, 10, 12, 13 and 15, after the liquid sequentially passes through the valve body 40, the third guide channel 141 and the output end 1411 of the third guide channel 141 to enter into the balanced channel 15, the liquid would flow toward the input end 1071 of the third connection channel 107. At this time, since the output end 1411 of the third guide channel 141 and the input end 1071 of the third connection channel 107 are staggered relative to each other, the liquid generates a certain amount of thrust to move the plunger 60 toward the first closed end 151 of the balanced channel 15 such that the liquid finally passes through the third connection channel 107 and is discharged into an external device 203 via the outlet 104 of the main casing 10.

Referring to FIGS. 1-3, in the first embodiment of the present invention, each of the three valve bodies 20, 30, 40 includes a needle valve 21, 31, 41 disposed within the valve chambers 12, 13, 14 respectively having an end portion protruding outwardly to an exterior of the main casing 10 and a knob 22, 32, 42 mounted on the end portion of the needle valve 21, 31, 41 such that activation of the knob 22, 32, 42 is capable of regulating an extension depth of the needle valve 21, 31, 41 within a respective one of the valve chambers 12, 13, 14.

Figure 12:
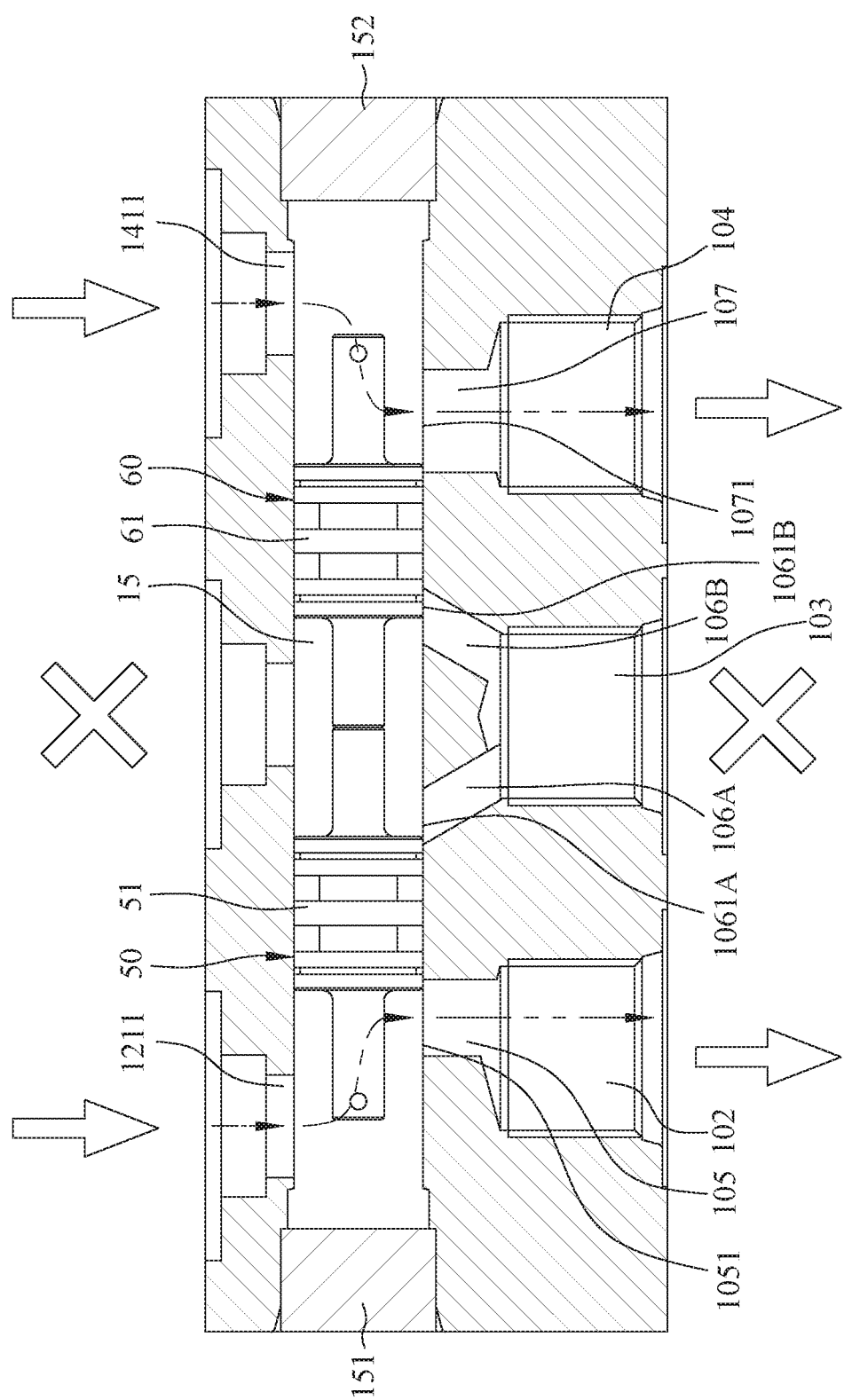

Referring to FIGS. 3, 4 and 5, each of the plungers 50, 60 includes a plunger body 51, 61, a first rod 52, 62 and a second rod 53, 63. The plunger body 51, 61 has an outer diameter less than an inner diameter of the balanced channel 15. More specifically, the plunger body 51, 61 has the outer diameter substantially less than the inner diameter of the balanced channel 15 by 0.02 mm. In other words, a gap of 0.02 mm is present between the external wall of the plunger body 51, 61 and the inner wall of the balanced channel 15 (the gap is not visible in the drawing) such that the plunger bodies 51, 61 are independently movable within the balanced channel 15. Since the plunger bodies 51, 61 are independently movable within the balanced channel 15, a portion of the liquid may permeate into the gap and remain within the gap due to its viscosity (that is to say, the viscosity of a fluid is a measure of its resistance to gradual deformation by shear stress or tensile stress) without passing through the gap such that the liquid cannot passing through the plunger bodies 51, 61. Each the plunger body 51, 61 has a longitudinal length greater than a diameter of the input ends 1051, 1061A, 1061B, 1071 of the first connection channel 105, the first branch channel 106A, the second branch channel 106B and the third connection channel 107 such that the plunger bodies 51, 61 of the plunger 50, 60 can selectively block the input ends 1051, 1061A, 1061B, 1071 of the first connection channel 105, the first branch channel 106A, the second branch channel 106B and the third connection channel 107. In this embodiment, the first rod 52, 62 of one of the plungers 50, 60 is axially connected to one end of the plunger body 51, 61 of one of the plungers 50, 60 away from the other one of the plungers 50, 60 while the second rod 53, 63 of one of the plungers 50, 60 is axially connected to the other end of the plunger body 51, 61 of one of the plungers 50, 60 proximate to the other one of the plungers 50, 60. Each of the first rods 52, 62 has an outer diameter less than an outer diameter of the plunger body 51, 61 while each of the second rods 53, 63 has an outer diameter less than the outer diameter of the plunger body 51, 61, therefore the liquid passes over the first rods 52, 62 and second rods 53, 63 and flows toward the input ends 1051, 1061A, 1061B, 1071 of the first connection channel 105, the first branch channel 106A, the second branch channel 106B and the third connection channel 107. The first rod 52 of the plunger 50 has a longitudinal length greater than the distance between the output end 1211 of the first guide channel 121 and the first closed end 151 of the balanced channel 15 but less than the distance between the input end 1051 of the first connection channel 105 and the first closed end 151 of the balanced channel 15. Under this condition and as best shown in FIG. 5, when the first rod 52 of the plunger 50 abuts against the first closed end 151 of the balanced channel 15, the first rod 51 of the plunger 50 does not block the output end 1211 of the first guide channel 121 so that the liquid can smoothly enter into the balanced channel 15 via the output end 1211 of the first guide channel 121. The first rod 62 of the plunger 60 has a longitudinal length greater than the distance between the output end 1411 of the third guide channel 141 and the second closed end 152 of the balanced channel 15 but less than the distance between the input end 1071 of the third connection channel 107 and the second closed end 152 of the balanced channel 15. Under this condition and as best shown in FIG. 5, when the first rod 62 of the plunger 60 abuts against the second closed end 152 of the balanced channel 15, the plunger body 61 of the plunger 60 does not block the output end 1411 of the third guide channel 141 so that the liquid can smoothly enter into the balanced channel 15 via the output end 1411 of the third guide channel 141. A total length of two second rods 53, 63 of the plungers 50, 60 is greater than the diameter of the output end 1311 of the second guide channel 131, and the total length of two second rods 53, 63 of the plungers 50, 60 is less than a distance between outer sides of the input ends 1061A, 1061B of the first and second branch channels 106A, 106B. Under this condition and as best shown in FIG. 12, when two second rods 53, 63 of the plungers 50, 60 abut against each other, the plunger bodies 51, 61 of the plungers 50, 60 do not block the output end 1311 of the second guide channel 131 so that the liquid can smoothly enter into the balanced channel 15 via the output end 1311 of the second guide channel 131.

The following paragraphs are used to explain seven flow regulating methods of the present invention with reference to the drawings.

Figure 6:
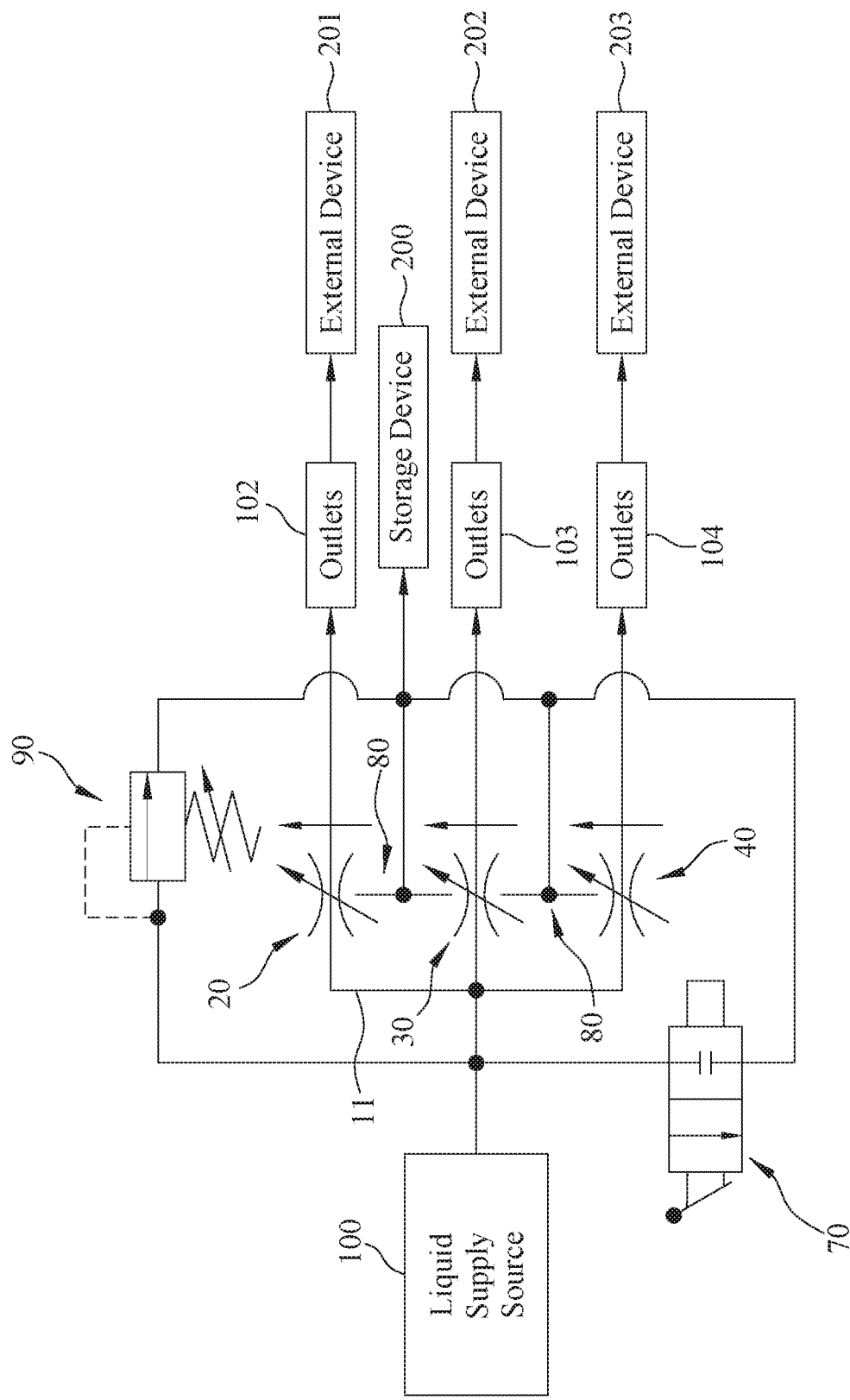
FIG. 6 illustrates connection relations among elements according to the first embodiment of the present invention.
Figure 9:
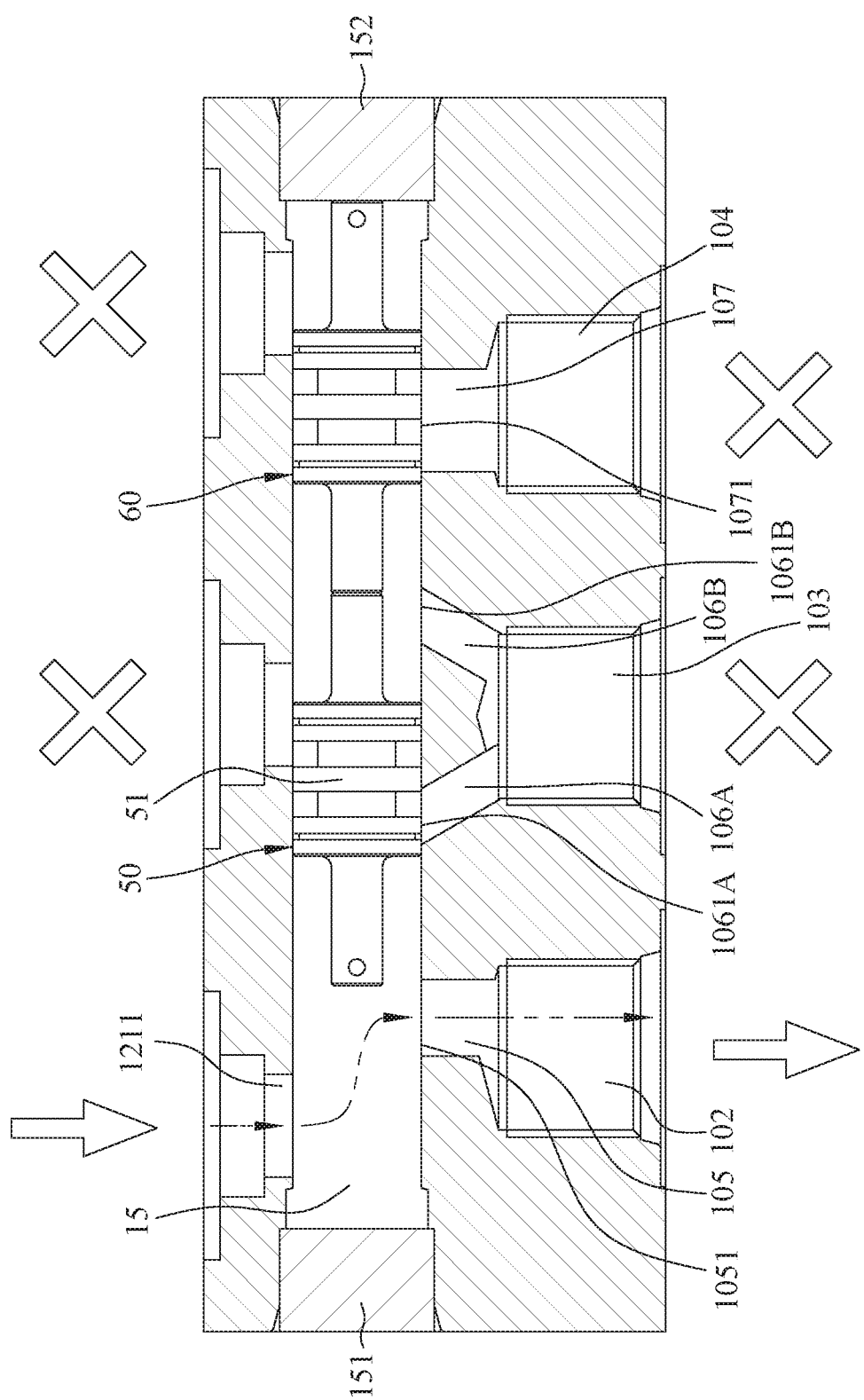
FIGS. 9-15 illustrate seven regulating methods of the liquid flow within the main casing according to the present invention.

A first liquid regulating method: referring to FIGS. 6, 8 and 9, when the valve body 20 is opened and the remaining two of the valve bodies 30, 40 are closed, after the liquid sequentially passes through the valve body 20, the first guide channel 121 and the output end 1211 of the first guide channel 121 to enter into the balanced channel 15, the liquid would flow toward the input end 1051 of the first connection channel 105. Under this condition and since the output end 1211 of the first guide channel 121 is staggered with the input end 1051 of the first connection channel 105, the liquid generates a certain amount of thrust to move the two plungers 50, 60 toward the second closed end 152 of the balanced channel 15 in such a manner that the plunger bodies 51, 61 of the two plungers 50, 60 are moved away from the input end 1051 of the first connection channel 105 so that the liquid can flow into the external device 201 via the first connection channel 105 and the outlet 102 while the plunger body 51 of the plunger 50 blocks the liquid, thereby preventing discharging of the liquid from remaining two the outlets 103, 104 to other two external devices 202, 203 after passing through the first and second branch channels 106A, 106B and the third connection channel 107 toward another two external devices 202, 203.

Figure 10:
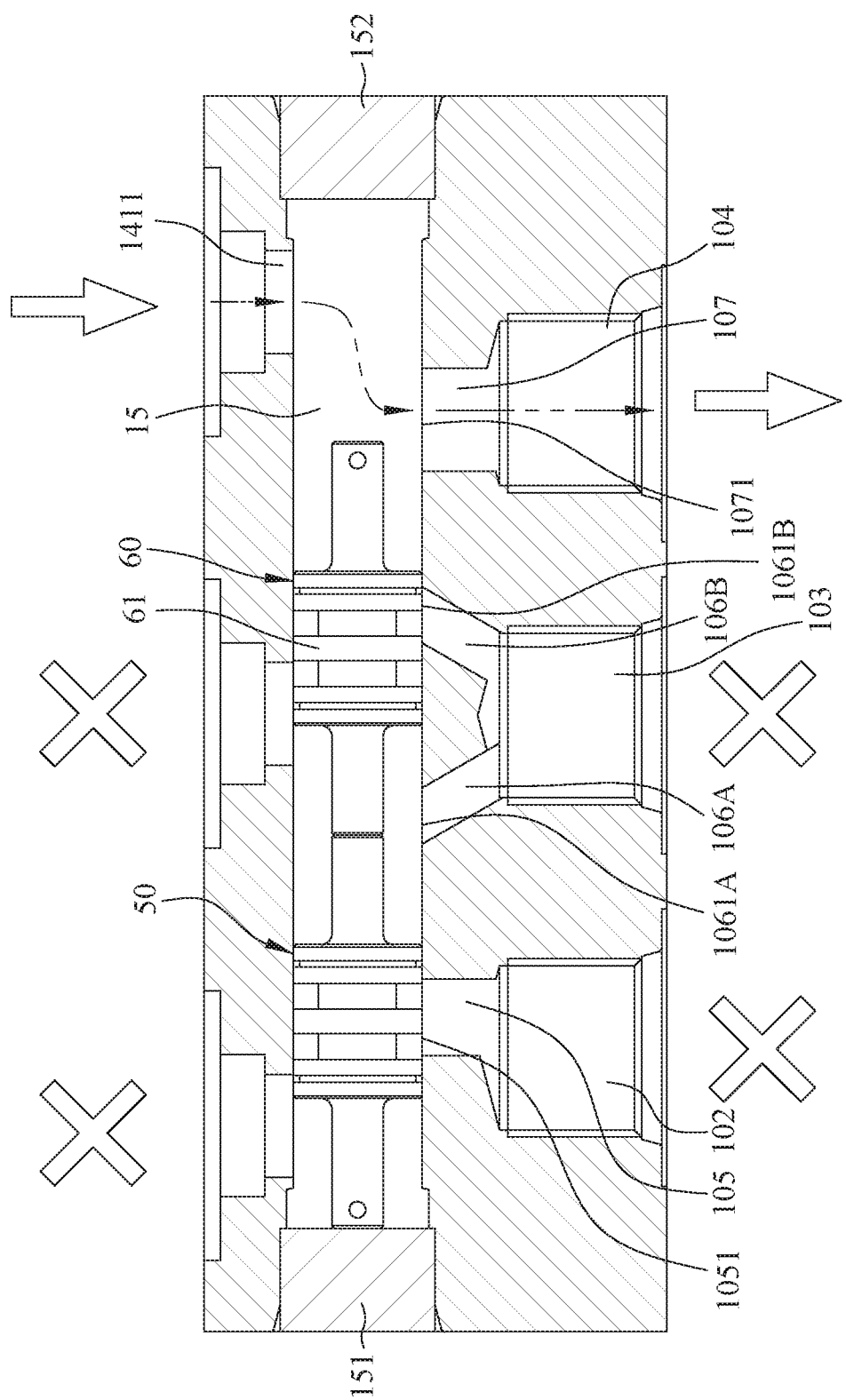

A second liquid regulating method: referring to FIGS. 6, 8 and 10, when the valve body 40 is opened and the remaining two of the valve bodies 20, 30 are closed, after the liquid sequentially passes through the valve body 40, the third guide channel 141 and the output end 1411 of the third guide channel 141 to enter into the balanced channel 15, the liquid would flow toward the input end 1071 of the third connection channel 107. Under this condition and since the output end 1411 of the third guide channel 141 is staggered with the input end 1071 of the third connection channel 107, the liquid generates a certain amount of thrust to move the two plungers 50, 60 toward the first closed end 151 of the balanced channel 15 in such a manner that the plunger bodies 51, 61 of the two plungers 50, 60 are moved away from the input end 1071 of the third connection channel 107 so that the liquid can flow into the external device 203 via the third connection channel 107 and the outlet 104 while the plunger body 61 of the plunger 60 blocks the liquid, thereby preventing discharging of the liquid from remaining two the outlets 102, 103 after passing through the first connection channel 105 and the first and second branch channels 106A, 106B toward another two external devices 201, 202.

Figure 11:
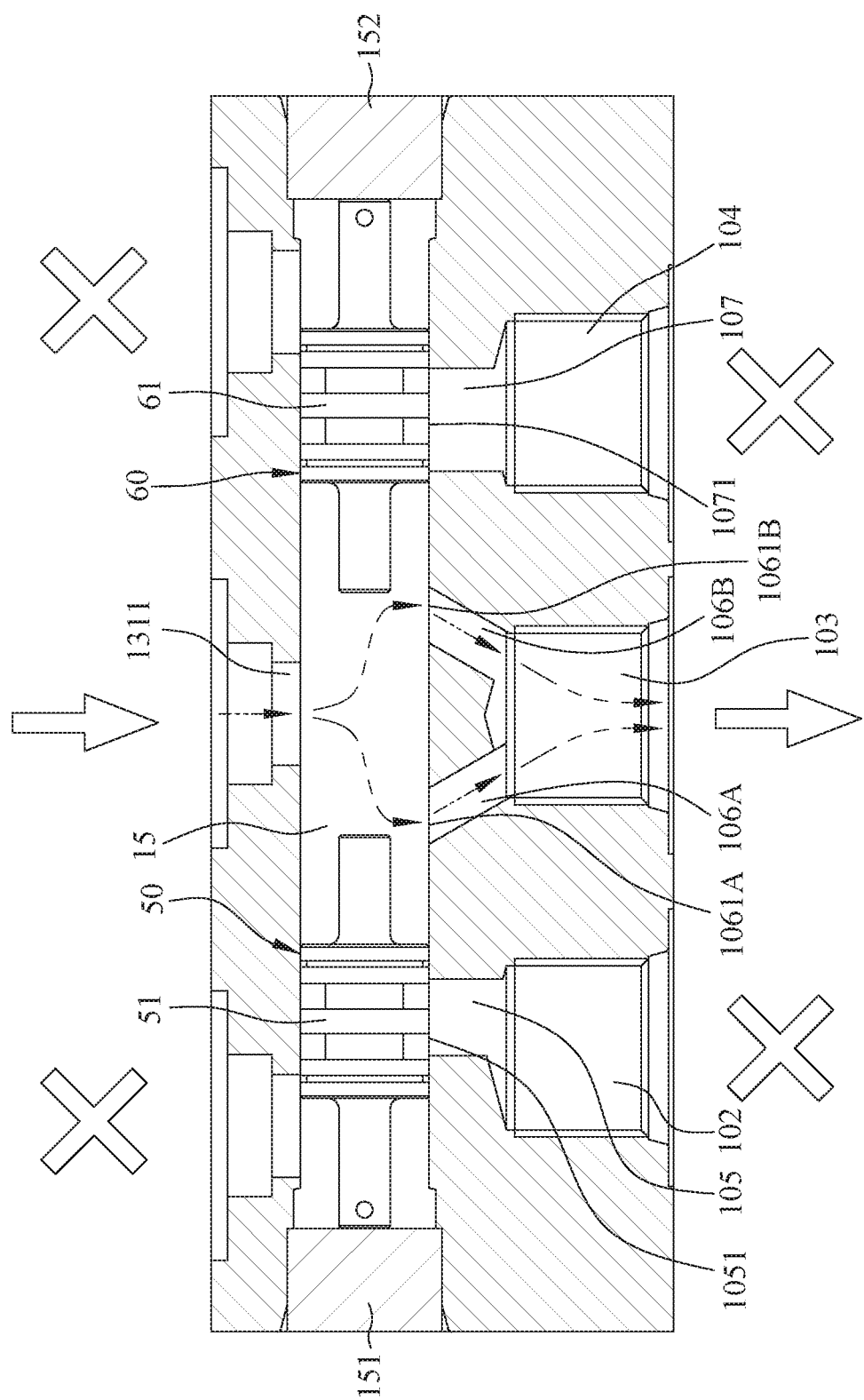

A third liquid regulating method: referring to FIGS. 6, 8 and 11, when the valve body 30 is opened and the remaining two valve bodies 20, 40 are closed, after the liquid sequentially passes through the valve body 30, the second guide channel 131 and the output end 1311 of the second guide channel 131 to enter into the balanced channel 15, the liquid would flow toward the input ends 1061A, 1061B of the first and second branch channels 106A, 106B. Under this condition and since the output end 1311 of the second guide channel 131 is staggered with the input ends 1061A, 1061B of the first and second branch channels 106A, 106B, the liquid generates a certain amount of thrust to move the two plungers 50, 60 toward the first and second closed ends 151, 152 of the balanced channel 15 respectively in such a manner that the plunger bodies 51, 61 of the two plungers 50, 60 are moved away from the input ends 1061A, 1061B of the first and second branch channels 106A, 106B so that the liquid passes through the first branch channel 106A and the second branch channel 106B and mixes again in the outlet 103 and flows into the external device 202 via the outlet 103 while the two plunger bodies 51, 61 of the two plungers 50, 60 block the liquid, thereby preventing discharging of the liquid from remaining two the outlets 102, 104 after passing through the first connection channel 105 and the third connection channel 107 toward two other external devices 201, 203.

A fourth liquid regulating method: referring to FIGS. 6, 8 and 12, when two of the valve bodies 20, 40 are opened and the valve body 30 is closed, after the liquid sequentially passes through two of the valve bodies 20, 40, the first guide channel 121 and the output end 1211 of the first guide channel 121, the third guide channel 141 and the output end 1411 of the third guide channel 141 to enter into the balanced channel 15, and then the liquid would flow toward the input ends 1051, 1071 of the first and third connection channels 105, 107. Under this condition, since the output end 1211 of the first guide channel 121 is staggered with the input end 1051 of the first connection channel 105 and since the output end 1411 of the third guide channel 141 is staggered with the input end 1071 of the third connection channel 107, the liquid generates a certain amount of thrust to move the two plungers 50, 60 toward the middle of the balanced channel 15 in such a manner that the two plunger bodies 51, 61 of the two plungers 50, 60 are moved away from the input ends 1051, 1071 of the first and third connection channels 105, 107. At this time, the liquid can be discharged into two external devices 201, 203 respectively from two of the outlets 102, 104 via the first and third connection channels 105, 107 while two plunger bodies 51, 61 of the plungers 50, 60 block the liquid, thereby preventing discharging of the liquid into another external device 202 from the outlet 103 via the first and second branch channels 106A, 106B.

Figure 13:
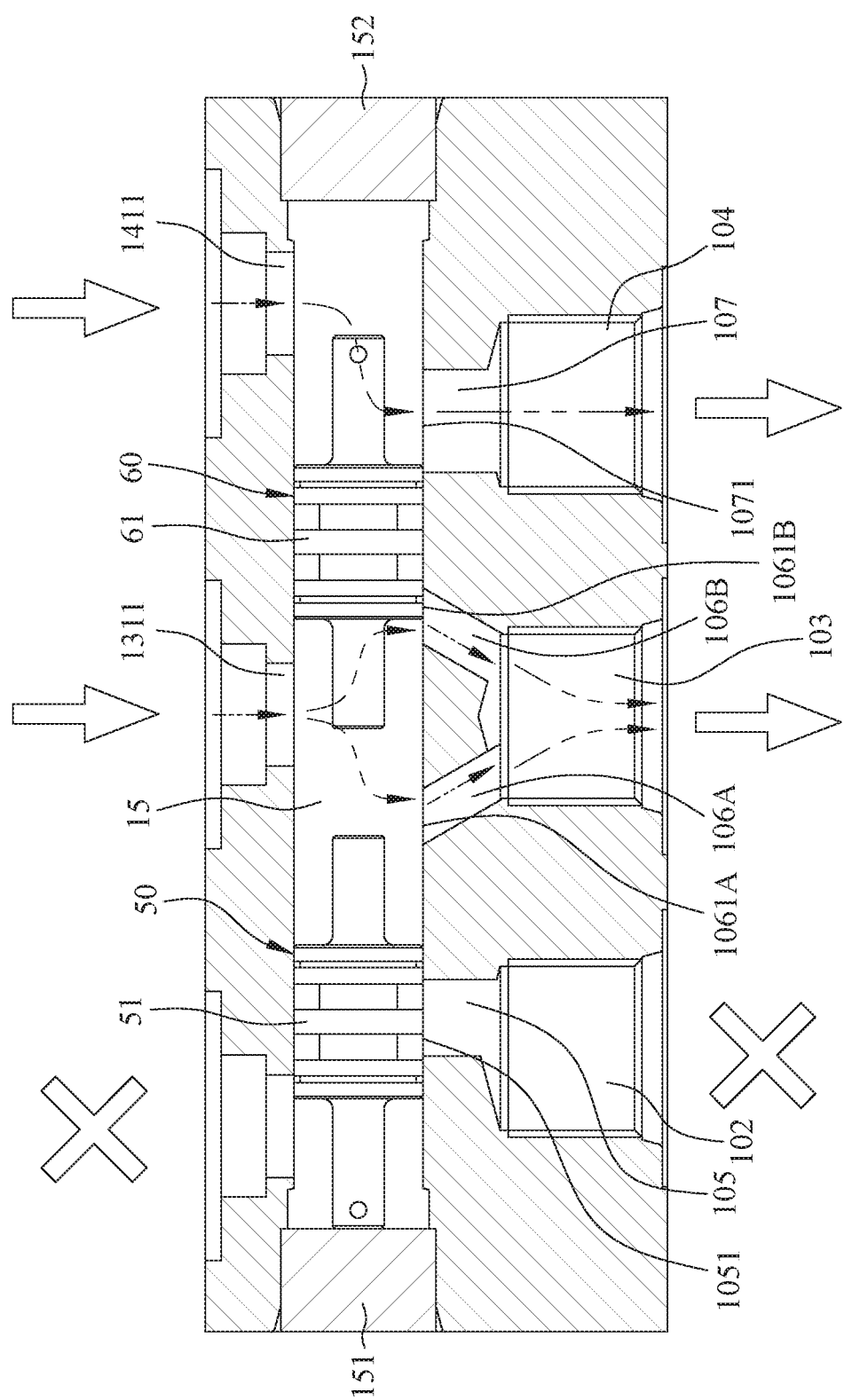

A fifth liquid regulating method: referring to FIGS. 6, 8 and 13, when two of the valve bodies 30, 40 are opened and the valve body 20 is closed, after the liquid sequentially passes through two of the valve bodies 30, 40, the second guide channel 131 and the output end 1311 of the second guide channel 131, the third guide channel 141 and the output end 1411 of the third guide channel 141 to enter into the balanced channel 15, and then the liquid would flow toward the input ends 1061A, 1061B, 1071 of the first and second branch channels 106A, 106B and the third connection channel 107. Under this condition, since the output end 1311 of the second guide channel 131 is staggered with the input ends 1061A, 1061B of the first and second branch channels 106A, 106B and since the output end 1411 of the third guide channel 141 is staggered with the input end 1071 of the third connection channel 107, the liquid generates a certain amount of thrust to move the plunger 60 in such a manner that the plunger 60 is disposed between the output ends 1311, 1411 of the second and third guide channels 131, 141, which in turn, moves the plunger 50 toward the first closed end 151 of the balanced channel 15 and hence moving the plunger bodies 51, 61 away from the input ends 1061A, 1061B, 1071 of the first and second branch channels 106A, 106B and the third connection channel 107 while the plunger body 51 of the plunger 50 simultaneously blocks the input end 1051 of the first connection channel 105. At this time, the liquid can be discharged into two external devices 202, 203 from two of the outlets 103, 104 respectively via the first and second branch channels 106A, 106B and the third connection channel 107 while the plunger body 51 of the plunger 50 blocks a portion of the liquid after passing through the output end 1311 of the second guide channel 131 entering into the balanced channel 15, thereby preventing discharging of the liquid into another external device 201 from the outlet 102 via the first connection channel 105.

Figure 14:
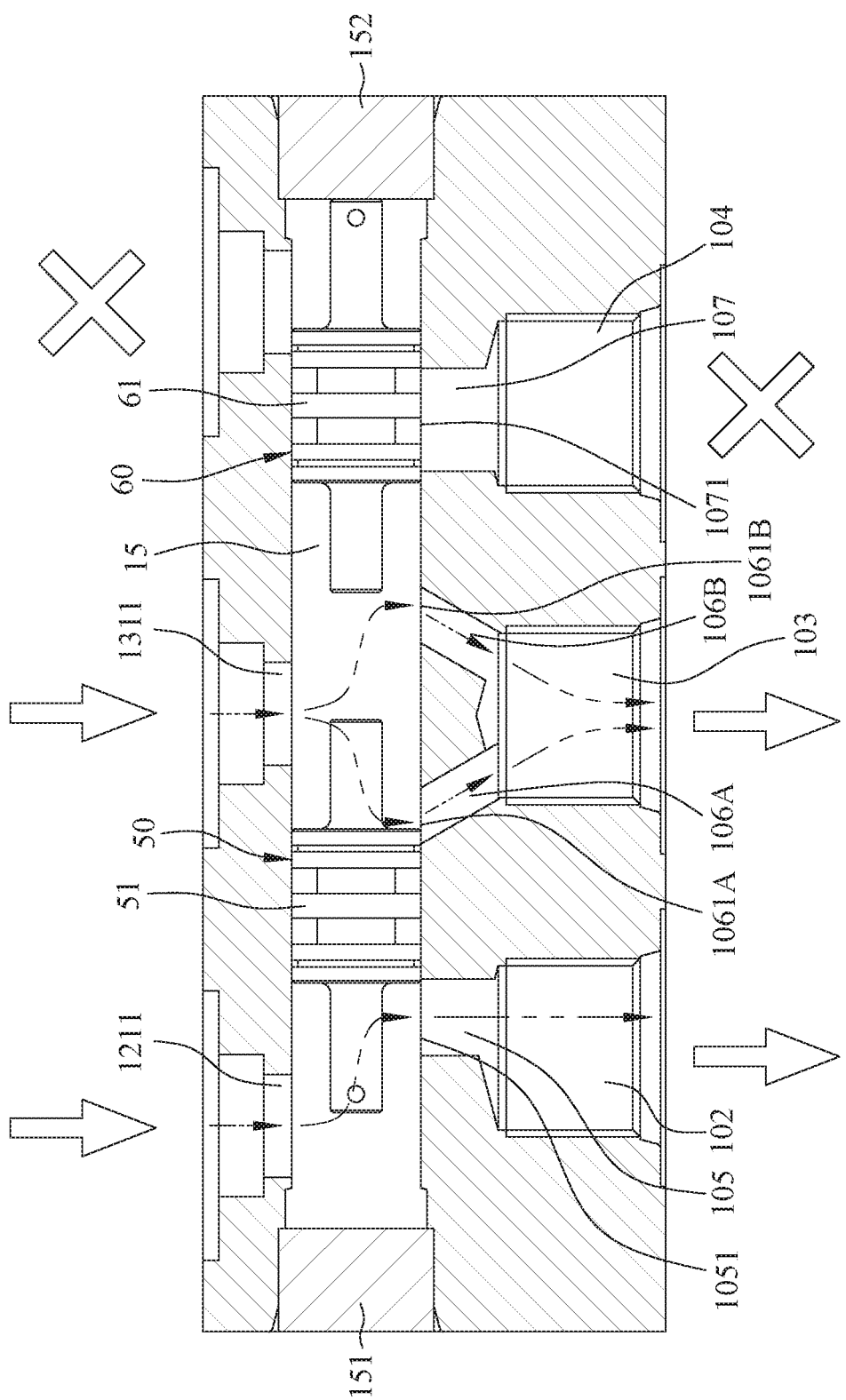

A sixth liquid regulating method: referring to FIGS. 6, 8 and 14, when two of the valve bodies 20, 30 are opened and the valve body 40 is closed, after the liquid sequentially passes through two of the valve bodies 20, 30, the first guide channel 121 and the output end 1211 of the first guide channel 121, the second guide channel 131 and the output end 1311 of the second guide channel 131 to enter into the balanced channel 15, and then the liquid would flow toward the input ends 1061A, 1061B, 1051 of the first and second branch channels 106A, 106B and the first connection channel 105. Under this condition, since the output end 1211 of the first guide channel 121 is staggered with the input end 1051 of the first connection channel 105 and since the output end 1311 of the second guide channel 131 is staggered with the input ends 1061A, 1061B of the first and second branch channels 106A, 106B, the liquid generates a certain amount of thrust to move the plunger 50 in such a manner that the plunger 50 is disposed between the output ends 1211, 1311 of the first and second guide channels 121, 131, which in turn, moves the plunger 60 toward the second closed end 152 of the balanced channel 15, and hence moving the plunger bodies 51, 61 away from the input ends 1061A, 1061B, 1051 of the first and second branch channels 106A, 106B and the first connection channel 105 while the plunger body 61 of the plunger 60 simultaneously blocks the input end 1071 of the third connection channel 107. At this time, the liquid c can be discharged into two external devices 201, 202 from two of the outlets 102, 103 via the first and second branch channels 106A, 106B and the first connection channel 105 while the plunger body 61 of the plunger 60 simultaneously blocks a portion of the liquid after passing through the output end 1311 of the second guide channel 131 entering into the balanced channel 15, thereby preventing discharging of the liquid into another external device 203 from the outlet 104 via the third connection channel 107.

Figure 15:
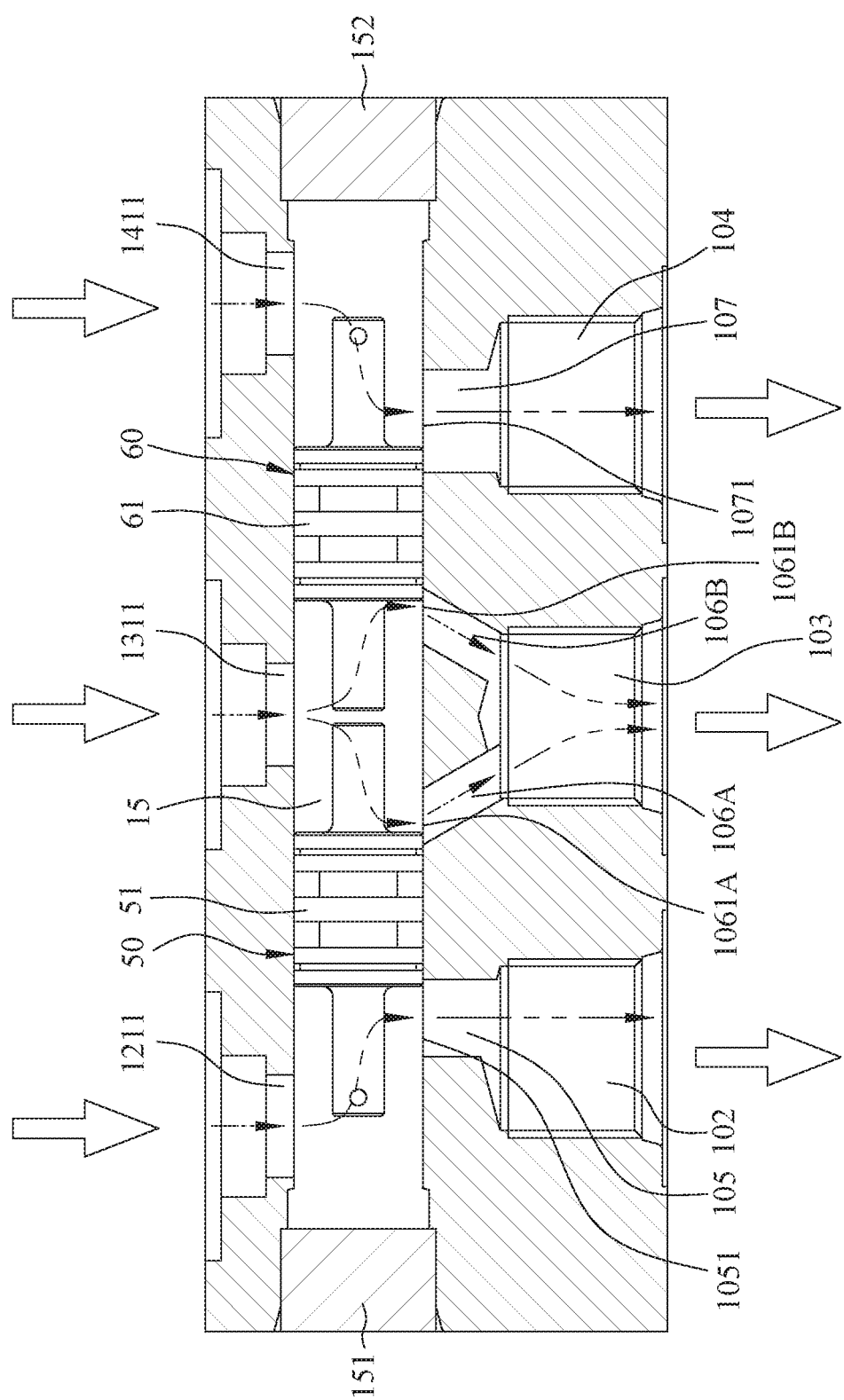

A seventh liquid regulating method: referring to FIGS. 6, 8 and 15, wherein, when all of the valve bodies 20, 30, 40 are opened, after the liquid sequentially passes through the valve bodies 20, 30, 40, the first guide channel 121 and the output end 1211 of the first guide channel 121, the second guide channel 131 and the output end 1311 of the second guide channel 131, the third guide channel 141 and the output end 1411 of the third guide channel 141 to enter and the balanced channel 15, and then the liquid would flow toward the input ends 1051, 1061A, 1061B, 1071 of the first connection channel 105 and the first and second branch channels 106A, 106B and the third connection channel 107. Under this condition, since the output end 1211 of the first guide channel 121 is staggered with the input end 1051 of the first connection channel 105 and since the output end 1311 of the second guide channel 131 is staggered with the input ends 1061A, 1061B of the first and second branch channels 106A, 106B and since the output end 1411 of the third guide channel 141 is staggered with the input end 1071 of the third connection channel 107, the liquid generates a certain amount of thrust to move the plunger 50 in such a manner that the plunger 50 is disposed within the balanced channel 15 between the output ends 1211, 1311 of the first and second guide channels 121, 131 while the other plunger 60 is moved to be disposed between the output ends 1311, 1411 of the second and third guide channels 131, 141, thereby moving the plunger bodies 51, 61 of the plunger 50, 60 away from the output ends 1051, 1061A, 1061B, 1071 of the first connection channel 105 and the first and second branch channels 106A, 106B and the third connection channel 107. At this time, the liquid can be discharged into three external devices 201, 202, 203 from all of the outlets 102, 103, 104 of the main casing 10 via the first connection channel 105, the first and second branch channels 106A, 106B and the third connection channel 107.

Referring again to FIGS. 1 to 4 and 6, the external wall of the main casing 10 is further formed with an overflow opening 108. The main casing 10 further defines an overflow valve chamber 18 in communication with the split-flow path 11 and the overflow opening 108 and three pressure relief channels 181-183 in communication between the overflow valve chamber 18 and the valve chambers 12, 13, 14, respectively. The liquid control valve assembly of the present invention further includes an overflow valve unit 80 disposed in the overflow valve chamber 18 such that a portion of the liquid (redundant liquid) within the split-flow path 11 that does not pass through the valve bodies 20, 30, 40 is discharged to a storage device 200 (a collection tank) via the overflow opening 108 after passing through the overflow valve unit 80 while some of the liquid permeated within the overflow valve unit 80 is relieved into the valve chambers 12, 13, 14 through the pressure relief channels 181, 182, 183 such that pressures of two ends of the overflow valve unit 80 are different from each other. A spring 81 is installed within the overflow valve unit 80 in order to provide the biasing force of a valve element 82 so as to enhance opening and closing of the overflow valve unit 80, thereby maintaining the overflow valve unit 80 to discharge the redundant liquid.

Referring to FIGS. 1, 2, 3 and 6, the main casing 10 defines a high pressure relief valve chamber 192 therein. The liquid control valve assembly of the present invention further includes a high pressure relief valve 90 disposed in the high pressure relief valve chamber 192 and having an end portion protruding outwardly to an exterior of the main casing 10 and the other end portion extending into the split-flow path 11 such that the high pressure relief valve 90 is capable of reducing a liquid pressure within the split-flow path 11 in the main casing 10. When the liquid pressure within the split-flow path 11 is greater than the biasing force of a spring 91 within the high pressure relief valve 90, the liquid pushes a valve part 92 of the high pressure relief valve 90 to be moved to compress the spring 91 of the high pressure relief valve 90 such that some of the liquid is discharged into the storage device 200 after passing through the high pressure relief valve 90, thereby reducing the liquid pressure within the split-flow path 11 in the main casing 10. In other words, the valve bodies 20, 30, 40 are supplied with a stable and balanced liquid.

Figure 16:
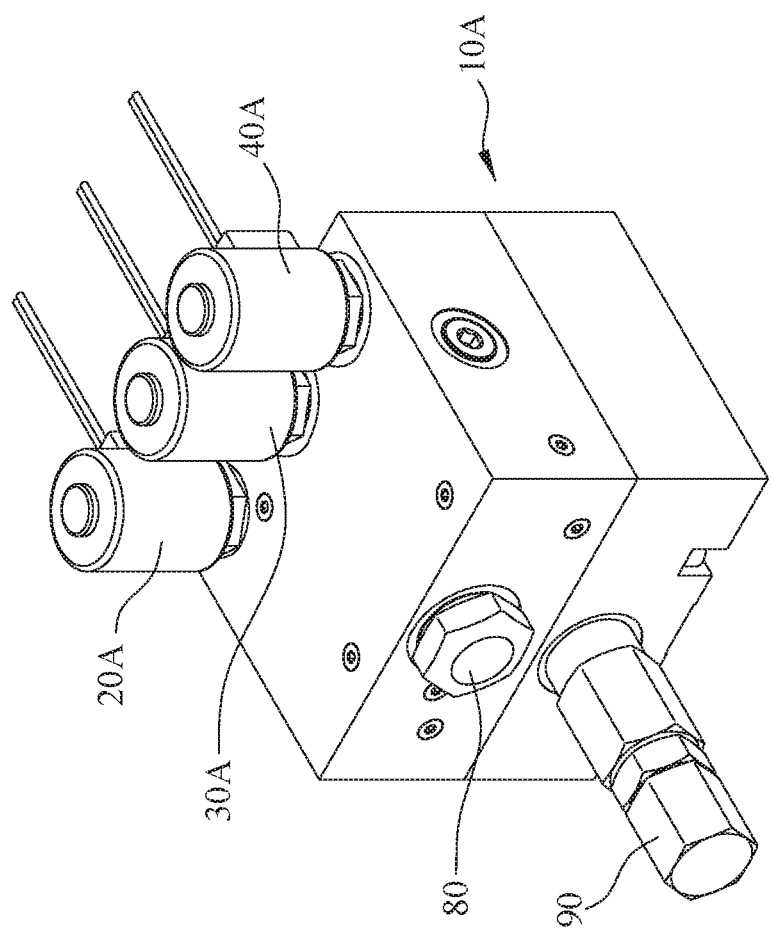
FIG. 16 is a perspective view of a liquid control valve assembly according to a second embodiment of the present invention.
Figure 17:
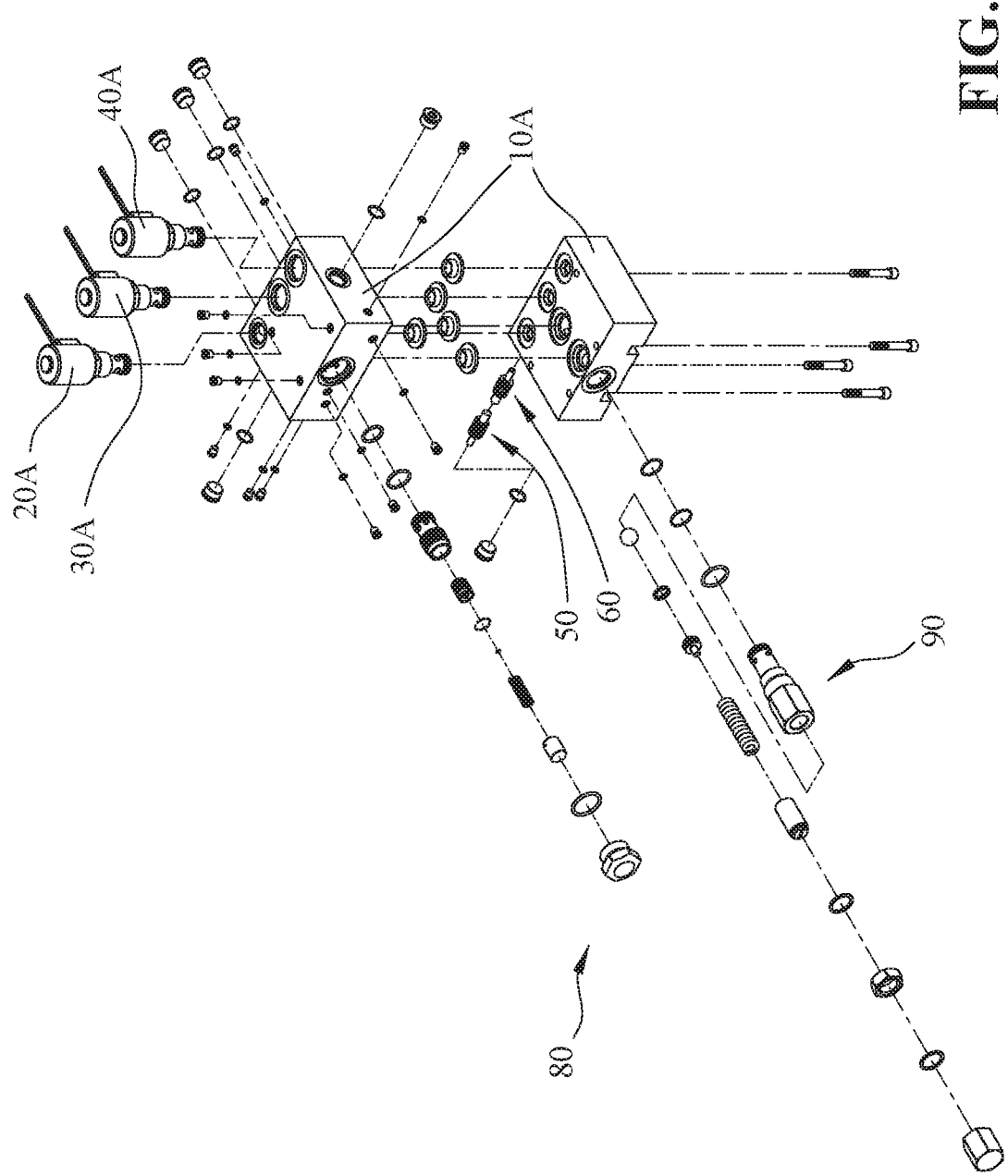
FIG. 17 is an exploded view of the liquid control valve assembly according to the second embodiment of the present invention.

FIGS. 16 and 17 respectively show perspective and exploded views of a liquid control valve assembly according to the second embodiment of the present invention. The only difference in comparison to the first embodiment resides in that each of three valve bodies 20A, 30A, 40A is a solenoid valve, the switch valve 70 is omitted and the main casing 10A is modified a little bit. The advantage of the solenoid valve is that the liquid flow and flow velocity of the liquid flowing through each of the valve bodies 20A, 30A, 40A can be remotely controlled and activated via a remote control (not shown in the drawing). Therefore, the user needs not approach the liquid control valve assembly in order to manually turn the knobs 22, 32, 42 on the main casing 10. It is to note that the expense for manufacturing the second embodiment is higher than the first embodiment owing to construction cost for the needle valves 21, 31, 41, the knobs 22, 32, 42 of the valve bodies 20, 30, 40.

As described above, since the plungers 50, 60 are disposed within the balanced channel 15 to be movable independently and since the plungers 50, 60 are moved to different positions relative to the outlets 102, 103, 104 due to the liquid flow within the first, second and third guide channels 121, 131, 141 in a respective valve body 20, 30 40, the liquid flow and the flow velocity of the liquid discharged from the outlets 102, 103, 104 of the main casing 10 can be stably regulated. In other words, the problem of sudden rise and fall of the liquid flow and the flow velocity of the liquid encountered in the prior art can be avoided.

It is noted that the liquid control valve assembly in the first and second embodiments are four-way valves that have one inlet and three outlet as the best embodiments but not limited to. In other embodiment, the liquid control valve assembly has three or more than three valve bodies and three or more than three outlets and two or more than two plungers. For example, the liquid control valve assembly has four valve bodies and four outlets so as to be a five-way valve that has one inlet and four outlets while including three plungers. For example, the liquid control valve assembly has five valve bodies and five outlets so as to be a six-way valve that has one inlet and five outlets while including four plungers. Therefore, the liquid control valve assembly having the number of the valve body and the number of the outlet are more than or equal to three and having the number of the plunger is more than or equal to two can achieve the same effect as the first and second embodiments.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A liquid control valve assembly comprising:
a main casing having an external wall formed with an inlet and three outlets, defining a split-flow path, three valve chambers and a balanced channel therein such that said split-flow path is in communication with said inlet and said valve chambers while said balanced channel is in communication with said valve chambers and said three outlets so that when said inlet is connected to a liquid source, a liquid supplied by the liquid source sequentially passes through said inlet and said split-flow path to enter into said three valve chambers;
three valve bodies disposed in said valve chambers respectively to regulate a liquid flow and a flow velocity of the liquid entering into said balanced channel after passing through said three valve bodies; and
two plungers independently movable within said balanced channel;
wherein, when one of said valve bodies is opened and the remaining two of said valve bodies are closed, the liquid passes through said one of said valve bodies to enter into said balanced channel to move said two plungers within said balanced channel in such a manner that said two plungers are moved away from an input end of one of said outlets so as to permit discharge of said liquid from one of said outlets while at least one of said plungers blocks the liquid, thereby preventing discharging of the liquid from remaining two said outlets;
wherein, when two of said valve bodies are opened and the remaining one of said valve bodies is closed, the liquid passes through two of said valve bodies to enter into said balanced channel to move said two plungers within said balanced channel in such a manner that said two plungers are moved away from input ends of two of said outlets so as to permit discharge of said liquid from two of said outlets while at least one of said plungers blocks the liquid, thereby preventing discharging of the liquid from remaining one of said outlets; and
wherein, when all of said valve bodies are opened, the liquid passes through all of said valve bodies to enter into said balanced channel to move said two plungers within said balanced channel in such a manner that said two plungers are moved away from the input ends of all of said outlets so as to permit discharge of said liquid from all of said outlets;
wherein said main casing further defines a switch valve chamber therein; wherein the liquid control valve assembly further comprises a switch valve disposed in said switch valve chamber and having an end portion protruding outwardly to an exterior of said main casing and the other end portion extending into said split-flow path such that said switch valve regulates the liquid flow and the flow velocity of the liquid entering into the split-flow path after passing through said switch valve.

2. The liquid control valve assembly according to claim 1, wherein said valve chambers are in communication with said balanced channel via a first guide channel, a second guide channel and a third guide channel respectively while said outlets are in communication with said balanced channel via a first connection channel, a second connection channel and a third connection channel respectively; and wherein said balanced channel has a first closed end and a second closed end;
wherein, an output end of said first guide channel and an input end of said first connection channel are located proximate to said first closed end of said balanced channel and are staggered relative to each other;
wherein, an output end of said second guide channel is located between said output end of said first guide channel and an output end of said third guide channel while an input end of said second connection channel is located between said input end of said first connection channel and an input end of said third connection channel; and
wherein, said output end of said third guide channel and said input end of said third connection channel are located proximate to said second closed end of said balanced channel and are staggered relative to each other.

3. The liquid control valve assembly according to claim 2, wherein said second connection channel includes a first branch channel and a second branch channel; wherein said output end of said second guide channel is staggered with an input end of said first branch channel and is further staggered with an input end of said second branch channel while said output end of said second guide channel is oriented toward a wall between said input end of said first branch channel and said input end of said second branch channel.

4. The liquid control valve assembly according to claim 3, wherein a distance between the output end of said first guide channel and said first closed end of said balanced channel is less than a distance between the input end of the first connection channel and the first closed end of the balanced channel; wherein a distance between the output end of said third guide channel and said second closed end of said balanced channel is less than a distance between said input end of said third connection channel and said second closed end of said balanced channel.

5. The liquid control valve assembly according to claim 4, wherein each of said plungers includes a plunger body, a first rod and a second rod; wherein said plunger body has an outer diameter less than an inner diameter of said balanced channel and a longitudinal length greater than a diameter of said input ends of said first connection channel, said first branch channel, said second branch channel and said third connection channel; wherein said first rod of one of said plungers is axially connected to one end of said plunger body of one of said plungers away from the other one of said plungers while said second rod of one of said plungers is axially connected to the other end of said plunger body of one of said plungers proximate to the other one of said plungers; wherein each of said first rods has an outer diameter less than an outer diameter of said plunger body while each of said second rods has an outer diameter less than the outer diameter of said plunger body; wherein said first rod of one of said plungers has a longitudinal length greater than the distance between said output end of said first guide channel and said first closed end of said balanced channel but less than the distance between said input end of said first connection channel and said first closed end of said balanced channel; wherein said first rod of the other one of said plungers has a longitudinal length greater than the distance between said output end of said third guide channel and said second closed end of said balanced channel but less than the distance between said input end of said third connection channel and said second closed end of said balanced channel; and wherein a total length of said second rods of said plungers is greater than said diameter of said output end of said second guide channel but less than a distance between outer sides of said input ends of said first and second branch channels.

6. The liquid control valve assembly according to claim 1, wherein said external wall of said main casing is further formed with an overflow opening and said main casing further defines an overflow valve chamber in communication with said split-flow path and said overflow opening and three pressure relief channels in communication between said overflow valve chamber and said valve chambers respectively; wherein the liquid control valve assembly further comprises an overflow valve unit disposed in said overflow valve chamber such that a portion of the liquid within said split-flow path that does not pass through said valve bodies is discharged to an exterior of said main casing via said overflow opening after passing through said overflow valve unit while some of the liquid permeated within said overflow valve unit is relieved into said valve chambers through said pressure relief channels.

7. The liquid control valve assembly according to claim 1, wherein each of said three valve bodies includes a needle valve disposed within said valve chambers respectively having an end portion protruding outwardly to an exterior of said main casing and a knob mounted on the end portion of said needle valve such that activation of said knob is capable of regulating an extension depth of said needle valve within a respective one of said valve chambers.

8. The liquid control valve assembly according to claim 1, wherein each of said three valve bodies is a solenoid valve.

9. The liquid control valve assembly according to claim 1, wherein said main casing further defines a high pressure relief valve chamber therein; wherein the liquid control valve assembly further comprises a high pressure relief valve disposed in said high pressure relief valve chamber and having an end portion protruding outwardly to an exterior of said main casing and the other end portion extending into said split-flow path such that said high pressure relief valve is capable of reducing a liquid pressure within said split-flow path in said main casing.

* * * * *